United States Patent
Saito

(10) Patent No.: US 8,332,088 B2
(45) Date of Patent: Dec. 11, 2012

(54) CONTROL DEVICE AND CONTROL METHOD FOR VEHICLE

(75) Inventor: Kimio Saito, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 766 days.

(21) Appl. No.: 12/530,072

(22) PCT Filed: Mar. 5, 2008

(86) PCT No.: PCT/JP2008/054434
§ 371 (c)(1),
(2), (4) Date: Sep. 4, 2009

(87) PCT Pub. No.: WO2008/108498
PCT Pub. Date: Sep. 12, 2008

(65) Prior Publication Data
US 2010/0063661 A1 Mar. 11, 2010

(30) Foreign Application Priority Data
Mar. 6, 2007 (JP) .................. 2007-055987

(51) Int. Cl.
*B60W 20/00* (2006.01)
*G06F 17/00* (2006.01)

(52) U.S. Cl. ............ 701/22; 180/65.1; 903/903
(58) Field of Classification Search ......... 180/65.1; 701/22
See application file for complete search history.

(56) References Cited

U.S. PATENT DOCUMENTS
6,694,232 B2 * 2/2004 Saito et al. ............. 701/22
7,290,627 B1 * 11/2007 Gardner ............. 180/65.1

FOREIGN PATENT DOCUMENTS

| JP | 2000-245016 A | 9/2000 |
|---|---|---|
| JP | 2003-333705 A | 11/2003 |
| JP | 2004-270512 A | 9/2004 |
| JP | 2005-133682 A | 5/2005 |
| JP | 2006-315631 A | 11/2006 |
| JP | 2006-321466 A | 11/2006 |
| JP | 2007-62589 A | 3/2007 |

* cited by examiner

Primary Examiner — Thomas Black
Assistant Examiner — Lin B Olsen
(74) Attorney, Agent, or Firm — Kenyon & Kenyon LLP

(57) ABSTRACT

In a hybrid vehicle equipped with an EV switch and a cruise switch operated by the driver, an ECU detects on/off of the EV switch and on/off of the cruise switch, determines whether or not both the EV switch and the cruise switch are on, and if both of them are on, prohibits transmission of an EV travel control command to an inverter and an engine ECU and transmits a cruise travel control command thereto.

15 Claims, 7 Drawing Sheets

F I G. 1
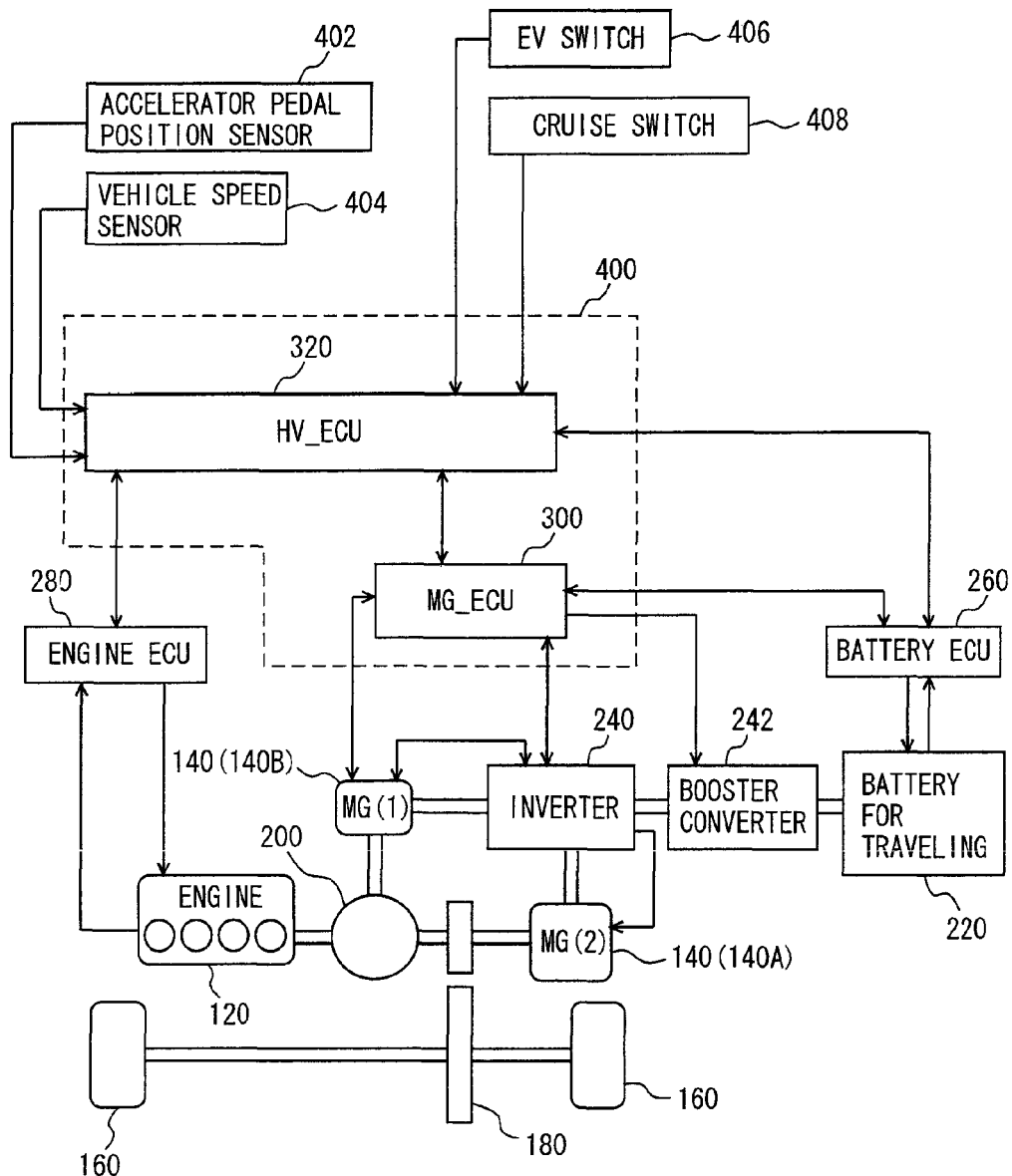

F I G. 7
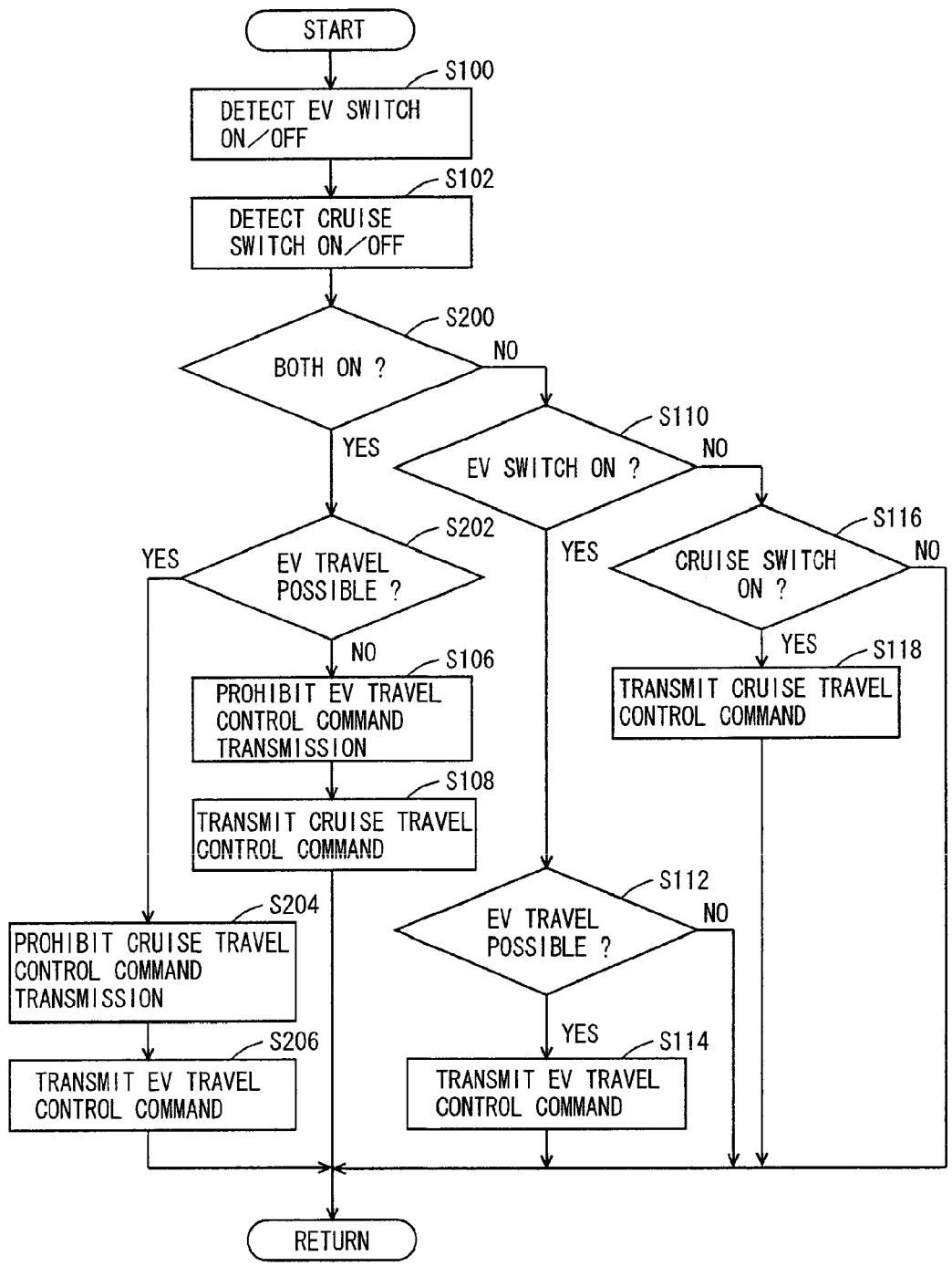

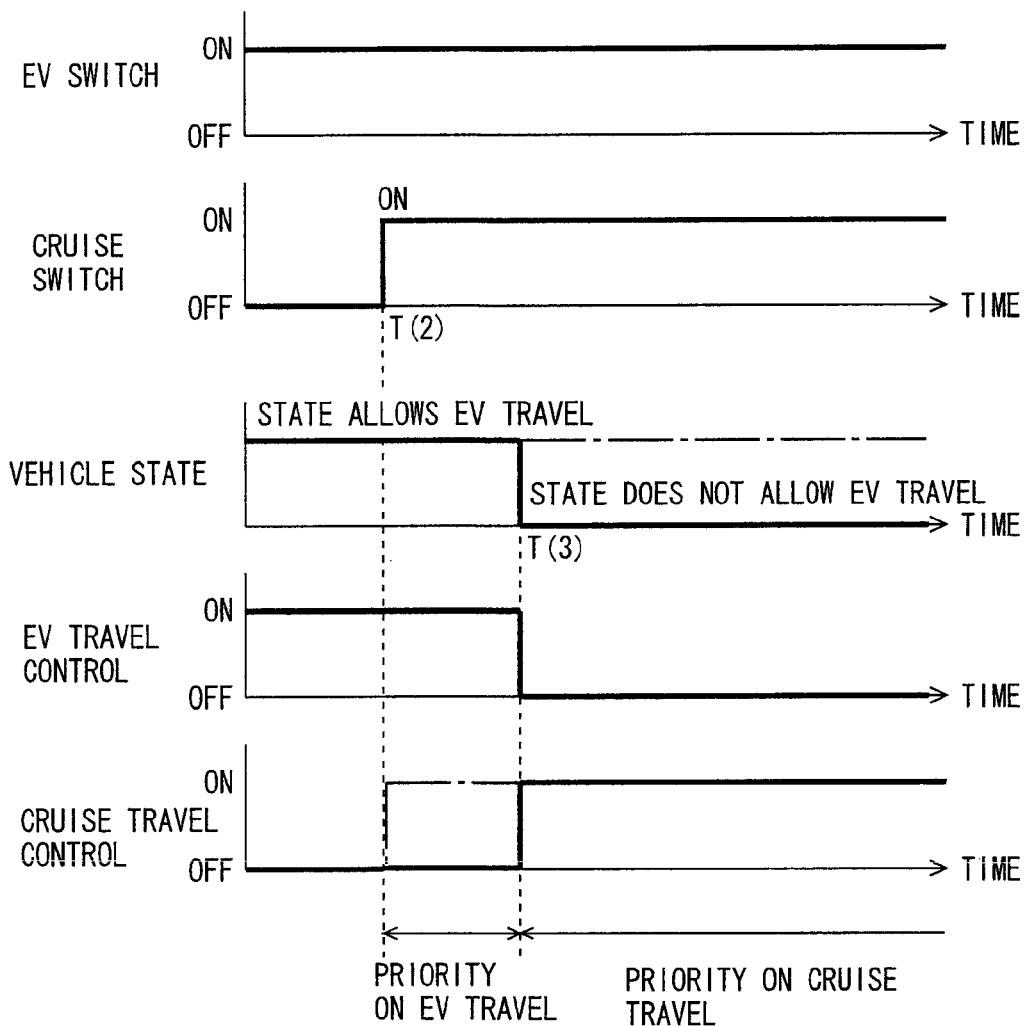

CONTROL DEVICE AND CONTROL METHOD FOR VEHICLE

This is a 371 national phase application of PCT/JP2008/054434 filed 5 Mar. 2008, claiming priority to Japanese Patent Application No. 2007-055987 filed 6 Mar. 2007, the contents of which are incorporated herein by reference.

TECHNICAL FIELD

The present invention relates to control of a hybrid vehicle, in particular, to control of a hybrid vehicle allowing a travel only by motive power of a motor (motor travel) and a travel in which at least either one of a vehicle speed and a distance between two vehicles is automatically kept constant (cruise travel).

BACKGROUND ART

In recent years, a hybrid vehicle with an engine and a motor, which travels by motive power of at least either one of the engine and the motor, is known. In such a hybrid vehicle, improvement in fuel efficiency is provided by switching two modes based on the operational state of the vehicle: an engine travel mode in which the travel is mainly performed by motive power of the engine; and a motor travel mode in which the travel is performed only by motive power of the motor (also referred to as a motor travel or an EV (Electric Vehicle) travel hereinafter). Furthermore, there exists a vehicle, as a hybrid vehicle, provided with a control device for performing a travel in which at least either one of the vehicle speed and the distance between two vehicles is automatically kept constant (also referred to as a cruise travel hereinafter) when operated by a driver. The technique with respect to control of a hybrid vehicle allowing such a cruise travel is disclosed in, for example, Japanese Patent Laying-Open No. 2005-133682.

The control device disclosed in Japanese Patent Laying-Open No. 2005-133682 controls the hybrid vehicle that can utilize either one or both of engine power and motor power as driving force of the vehicle and is provided with a generator driven by the engine and a battery charged by the generator and serving as a driving source of the motor, such that the vehicle travels at a fixed speed. This control device includes a setting unit for setting a target vehicle speed of the vehicle by operation of a driver during the travel, a motor power control unit for controlling engine power and motor power to perform a fixed-speed travel at the target vehicle speed, an idle stop unit for performing an engine idle stop when the vehicle stops and the driving force is small, and an amount of charge of a battery is not less than a predetermined value, and an engine start-up unit for prohibiting the idle stop when the target vehicle speed is set during the travel by engine power, and for releasing the idle stop and starting up the engine when the target vehicle speed is set during the travel only by motor power.

According to the control device disclosed in Japanese Patent Laying-Open No. 2005-133682, the idle stop is prohibited and the engine is driven during the fixed-speed travel control, even if the vehicle speed is in a region in which the travel by motor power is allowed and the amount of charge of the battery is sufficient for performing the idle stop. Therefore, a situation where starting up and shutdown of the engine are repeated according to varying amount of charge of the battery, regardless of the driver's intention, and a shock is caused can be prevented.

Moreover, Japanese Patent Laying-Open No. 2003-333705 discloses a hybrid vehicle provided with an EV travel switch for enabling an EV travel by operation of a driver of the vehicle.

According to the hybrid vehicle disclosed in Japanese Patent Laying-Open No. 2003-333705, turning on the EV travel switch (EV switch) by the driver switches the vehicle to a mode in which the EV travel is compulsorily performed. This allows the driver to compulsorily stop the engine, by his/her own intention, and to drive the vehicle only by motive power of the motor, even when the vehicle is in a state where the engine should normally operate.

As described above, the control device disclosed in Japanese Patent Laying-Open No. 2005-133682 releases the idle stop and starts up the engine when a target vehicle speed for performing the fixed-speed travel (cruise travel) is set by the driver during the travel only by motor power (motor travel). However, the control device disclosed in Japanese Patent Laying-Open No. 2005-133682 is not provided with an EV switch. Therefore, no reference is made, in Japanese Patent Laying-Open No. 2005-133682, to the control in a case where the driver turns on both the EV switch and the cruise switch. Moreover, in Japanese Patent Laying-Open No. 2003-333705, the EV switch and the control in a case where the driver turns on the EV switch are disclosed while no cruise switch is provided. Therefore, no reference is made, in Japanese Patent Laying-Open No. 2003-333705, to the control in a case where the driver turns on both the EV switch and the cruise switch, as in Japanese Patent Laying-Open No. 2005-133682.

DISCLOSURE OF THE INVENTION

The present invention has been made to solve the above-described problems, and an object is to provide a control device and a method of controlling for preventing a hybrid vehicle from having a traveling state which is significantly different from the driver's intention when the driver selects both the motor travel and the cruise travel.

The control device according to the present invention controls a vehicle with an internal combustion engine and a rotating electric machine mounted, traveling by motive power of at least either one of the internal combustion engine and the rotating electric machine. This control device includes a motor travel selection detecting unit for detecting that the driver has selected the motor travel allowing the vehicle to travel by motive power of the rotating electric machine with the internal combustion engine being off, a cruise travel selection detecting unit for detecting that the driver has selected the cruise travel in which at least either one of the speed of the vehicle and the distance from another vehicle is automatically maintained at a predetermined value, and a control unit connected to the motor travel selection detecting unit and the cruise travel selection detecting unit. The control unit determines whether or not a predetermined motor travel condition is satisfied, based on the state of the vehicle, controls the vehicle to perform the motor travel when it is detected that the driver has selected the motor travel and when it is determined that the motor travel condition is satisfied, controls the vehicle to perform the cruise travel when it is detected that the driver has selected the cruise travel, and controls the vehicle to perform the cruise travel, with priority over the motor travel, when it is detected that the driver has selected both the motor travel and the cruise travel.

According to the present invention, at the time of the motor travel, turning the internal combustion engine off allows improvement in fuel efficiency and a quiet travel, while the driving force which the driver demands may not be fully generated since the vehicle travels only by motive power of the rotating electric machine. Therefore, even in the case where the driver has selected the motor travel, when the motor travel condition (for example, the condition that the remaining capacity of the battery for traveling for supplying electric power to the rotating electric machine is not less than a threshold or that the vehicle speed is not more than a threshold) is not satisfied, execution of the motor travel may be restricted. Therefore, if priority is given to the motor travel when the driver has selected both the motor travel and the cruise travel, execution of the motor travel may be restricted, leading to the state where neither the cruise travel nor the motor travel is performed. Priority is then given to the cruise travel over the motor travel when both the motor travel and the cruise travel are selected by the driver. By this, at least the cruise travel can be performed without fail. This allows preventing the vehicle from having a traveling state which is significantly different from the driver's intention, where neither the motor travel nor the cruise travel is performed even though both travels are selected by the driver. As a result, a control device can be provided, which can prevent the hybrid vehicle from having a traveling state which is significantly different from the driver's intention, when the driver has selected both the motor travel and the cruise travel.

Preferably, the control unit performs the cruise travel with priority, when it is determined that the motor travel condition is not satisfied, in addition to that it is detected that the driver has selected both the motor travel and the cruise travel.

According to the present invention, when both the motor travel and the cruise travel are selected and it is determined that the motor travel condition is not satisfied, the cruise travel is performed with priority. Therefore, compared to a case where priority is simply given to the cruise travel, the motor travel time can be made as long as possible, allowing improvement in fuel efficiency and a quiet travel for a longer time.

More preferably, the motor travel condition includes the condition that the required output value of the rotating electric machine is not more than a predetermined threshold.

According to the present invention, during the motor travel, for example, if the required output value of a rotating electric machine (torque value required for the rotating electric machine, for example) exceeds the threshold, in order to perform the cruise travel, execution of the motor travel is restricted. On the other hand, if the required output value of the rotating electric machine is limited to not more than the threshold, in order to perform the motor travel, for example, the speed of the vehicle is difficult to maintain and execution of the cruise travel is restricted. That is, it is difficult to perform the motor travel and the cruise travel at the same time. Therefore, it is desirable to give priority to either one of them. Now if priority is given to the motor travel, both the motor travel and the cruise travel will be restricted, unless the motor travel condition is satisfied. Therefore, priority is given to the cruise travel. By this, at least the cruise travel can be performed without fail.

Still more preferably, the control device controls the rotating electric machine such that the required output value is not more than the threshold, when the motor travel is performed.

According to the present invention, when the motor travel is performed, the required output value of the rotating electric machine is controlled to be not more than the threshold. Therefore, the motor travel condition is easier to be satisfied, allowing improvement in fuel efficiency and a quiet travel for a longer time. However, since the output power of the rotating electric machine is reduced, in order to perform the motor travel, the speed of the vehicle is difficult to maintain and execution of the cruise travel is restricted. Therefore, in such a situation where it is more difficult to perform the motor travel and the cruise travel at the same time as described above, priority is given to the cruise travel. By this, at least the cruise travel can be performed without fail.

Still more preferably, the control unit performs the cruise travel when the cruise travel condition, having fewer restrictions on the output of the vehicle than the motor travel condition, is satisfied, in addition to that it is detected that the driver has selected the cruise travel.

According to the present invention, the motor travel is not performed when the motor travel condition is not satisfied, and the cruise travel is not performed when the cruise travel condition is not satisfied. Note that the cruise travel condition has fewer restrictions on the output of the vehicle than the motor travel condition does. Therefore, the frequency with which the cruise travel is performed when priority is given to the cruise travel is higher than the frequency with which the motor travel is performed when priority is given to the motor travel. Therefore, priority is given to the cruise travel. By this, the frequency with which neither the motor travel nor the cruise travel is performed, even though both of them are selected, can be reduced.

BRIEF DESCRIPTION OF THE DRAWINGS

FIG. 1 shows a structure of a vehicle with a control device mounted according to a first embodiment of the present invention.

FIG. 7 is a flowchart showing a control structure of an ECU which is a control device according to a second embodiment of the present invention.

FIG. 8 is a timing chart showing an operation of the vehicle controlled by the control device according to the second embodiment of the present invention.

BEST MODES FOR CARRYING OUT THE INVENTION

Figure 2:
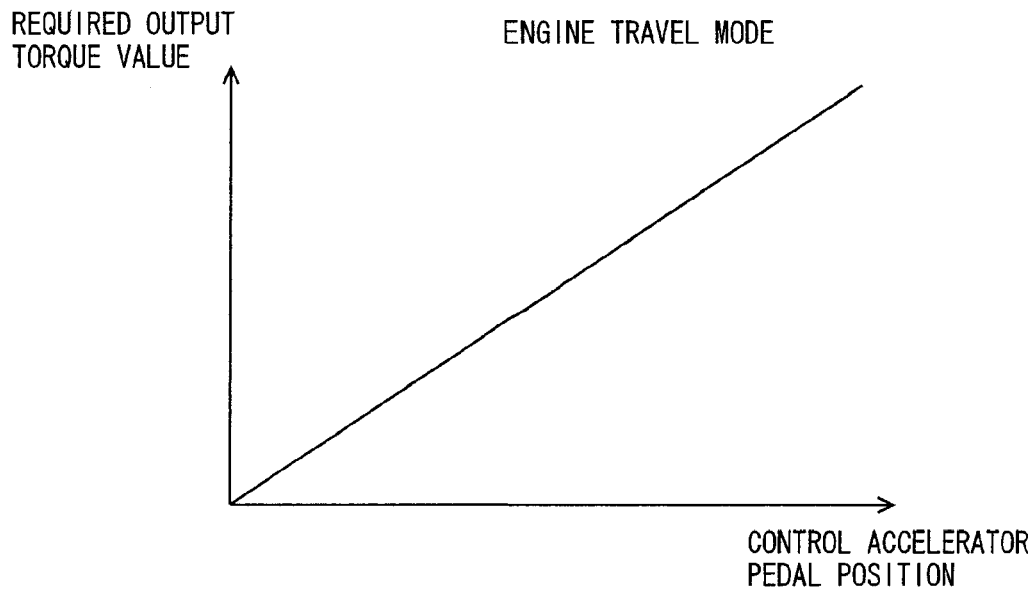
FIGS. 2 and 3 show a relation between a control accelerator pedal position and a required output torque value.

Embodiments of the present invention are described below with reference to drawings. In the following description, the same elements have the same reference characters allotted. Their names and functions are also the same. Therefore, details of description thereof will not be repeated.

First Embodiment

With reference to FIG. 1, a control block diagram of the entire hybrid vehicle equipped with the control device according to the present embodiment is described. Note that the present invention is not limited to the hybrid vehicle shown in FIG. 1. The present invention is applicable to any vehicle in which an internal combustion engine, for example, a gasoline engine and the like, serving as a motive power source (described as an engine hereinafter) is serving as a driving source (source of travel) for making the vehicle travel as well as a driving source for a generator. Furthermore, other vehicles such as a vehicle in which the driving sources are an engine and a motor generator, and which can travel by the motive power of the motor generator (with the engine turned off or without turning the engine off), or a hybrid vehicle with a battery for traveling mounted, having an EV mode, and having other manners to allow regenerative-braking control (the hybrid vehicle may be a so-called parallel type or a parallel series type) may be included. The battery may be a lithium ion battery, a nickel-hydrogen battery, and the like, and the type thereof is not limited. Moreover, a capacitor may be used instead of a battery.

The hybrid vehicle includes an engine 120 and a motor generator (MG) 140. Note that, in the following, motor generator 140 is also referred to as a motor generator 140A (MG (2) 140A) or motor generator 140B (MG (1) 140B), for convenience of description. Motor generator 140A functions as a generator or motor generator 140B functions as a motor, depending on the traveling state of the hybrid vehicle. When the motor generator functions as a generator, the regenerative braking is conducted. When the motor generator functions as a generator, the kinetic energy of the vehicle is converted into the electrical energy, and the vehicle is decelerated.

The hybrid vehicle, in addition to the above, includes: a decelerator 180 for transmitting motive power generated at engine 120 or motor generator 140 to a driving wheel 160 or transmitting drive of driving wheel 160 to motor generator 140; a power split device 200 for distributing motive power generated at engine 120 to two paths, for driving wheel 160 and MG (1) 140B; a battery 220 for traveling for charging electric power for driving motor generator 140; an inverter 240 for performing current control while converting direct current of battery 220 for traveling and alternating current of MG (2) 140A and MG (1) 140B; a battery control unit (referred to as a battery ECU (Electronic Control Unit) hereinafter) 260 for managing and controlling the state of charge/discharge (for example, SOC (State Of Charge)) of battery 220 for traveling; an engine ECU 280 for controlling the operating state of engine 120; an MG_ECU 300 for controlling motor generator 140, battery ECU 260, inverter 240, and the like, according to the state of the hybrid vehicle; and an HV_ECU 320 for controlling the entire hybrid system such that the hybrid vehicle can be operated most efficiently by managing and controlling battery ECU 260, engine ECU 280, MG_ECU 300, and the like, interactively.

Note that, though each ECU is shown as a separate component in FIG. 1, two or more ECUs may be integrated as one ECU configuration (an example is shown in FIG. 1 by the dotted line, where MG_ECU 300 and HV_ECU 320 are integrated in ECU 400).

An epicyclic-gear device (planetary gear) equipped with a planetary carrier (C), a sun gear (S) and a ring gear (R) is used for power split device 200, in order to distribute the motive power of engine 120 to both driving wheel 160 and MG (1) 140B. Engine 120 is connected to planetary carrier (C), MG (1) 140A is connected to sun gear (S), and MG (2) 140B and driving wheel 160 are connected to ring gear (R), respectively. By controlling the number of revolutions of MG (1) 140B, power split device 200 functions also as a continuously variable transmission. The rotating force of engine 120 is input to planetary carrier (C), and it is transmitted to MG (1) 140A by sun gear (S), and to MG (2) 140B and driving wheel 160 by ring gear (R). When turning rotating engine 120 off, kinetic energy of this rotation is converted into electrical energy at MG (1) 140B, since engine 120 is rotating, and the number of revolutions of engine 120 is reduced.

Inverter 240 includes 6 IGBTs (Insulated Gate Bipolar Transistor) and 6 diodes connected to the IGBTs in parallel, respectively, for passing current from an emitter side to a collector side of the IGBT.

Inverter 240 makes motor generator 140 function as a motor or as a generator, based on a control signal from ECU 400. When making motor generator 140 function as a motor, inverter 240 converts DC power supplied from battery 220 for traveling into AC power by switching the gate of each IGBT on/off (power distribution/cutoff), and supplies the AC power to motor generator 140. When making motor generator 140 function as a generator, inverter 240 converts AC power generated by motor generator 140 into DC power by switching the gate of each IGBT on/off (power distribution/cutoff) and charges battery 220 for traveling with the DC power. Since any well-known technique can be utilized for inverter 240 and IGBT, any further detailed description is not repeated here.

Furthermore, a booster converter 242 is provided between battery 220 for traveling and inverter 240. Booster converter 242 boosts up electric power before the electric power is supplied from battery 220 for traveling to MG (2) 140A or MG (1) 140B, because the rated voltage of battery 220 for traveling is lower than the rated voltage of MG (2) 140A or MG (1) 140B. Additionally, charging electric power is supplied to battery 220 for traveling after being stepped down by this booster converter, when the battery is charged.

An accelerator pedal position sensor 402, a vehicle speed sensor 404, an EV switch 406, and a cruise switch 408 are connected to ECU 400 by a harness and the like.

Accelerator pedal position sensor 402 detects a pedal position (actual accelerator pedal position) of the accelerator pedal (not shown) and transmits a signal indicating the detection result to ECU 400.

Vehicle speed sensor 404 detects the speed of the vehicle based on the number of revolutions of a driveshaft and transmits a signal indicating the detection result to ECU 400.

EV switch 406 is a switch for the driver to select the EV travel mode allowing the vehicle to travel with engine 120 off. When EV switch 406 is turned on by the driver and the EV travel mode is selected, EV switch 406 transmits a signal requesting the EV travel to ECU 400.

Cruise switch 408 is a switch for the driver to select the cruise travel mode in which at least either of the vehicle speed or a distance between two vehicles is automatically maintained, as well as for the driver to set up a target vehicle speed and a target distance between two vehicles to be maintained. When cruise switch 408 is turned on by the driver and the cruise travel mode is selected, cruise switch 408 transmits a signal requesting the cruise travel and including information on the target vehicle speed and the target distance between two vehicles to ECU 400. Note that cruise switch 408 may be provided with a vehicle speed setting switch for setting the target vehicle speed in a predetermined range, an increase/decrease switch for increasing/decreasing the target vehicle speed, and a change-over switch for changing over the target distance between two vehicles among three degrees, such as "long", "middle" and "short".

Based on the signal sent from battery ECU 260, accelerator pedal position sensor 402, vehicle speed sensor 404, EV switch 406, cruise switch 408, and the like, and a map and a program stored in a ROM (Read Only Memory), ECU 400 controls apparatuses such that the vehicle is in a desired traveling state.

ECU 400 makes a switch between the engine travel mode and the EV travel mode based on the operational state of the vehicle, in order to make the vehicle travel efficiently and improve fuel efficiency.

When ECU 400 receives the signal requesting the EV travel from EV switch 406, ECU 400 makes a switch to the EV travel mode, if the state of the vehicle allows the EV travel, and performs the EV travel control. ECU 400 controls engine ECU 280 and inverter 240 during execution of the EV travel control, such that the vehicle travels only by the motive power of motor generator 140 with engine 120 off.

In the engine travel mode, ECU 400 controls engine ECU 280 and inverter 240, as shown in FIG. 2, such that the larger the value representing the control accelerator pedal position becomes, the larger the value of driving force required for the vehicle (required output torque value) becomes. The control accelerator pedal position here refers to the accelerator pedal position used for control of the power of the vehicle. Usually the actual accelerator pedal position is set as the control accelerator pedal position, while it is set by ECU 400, as appropriate, during the cruise travel mode.

Figure 3:
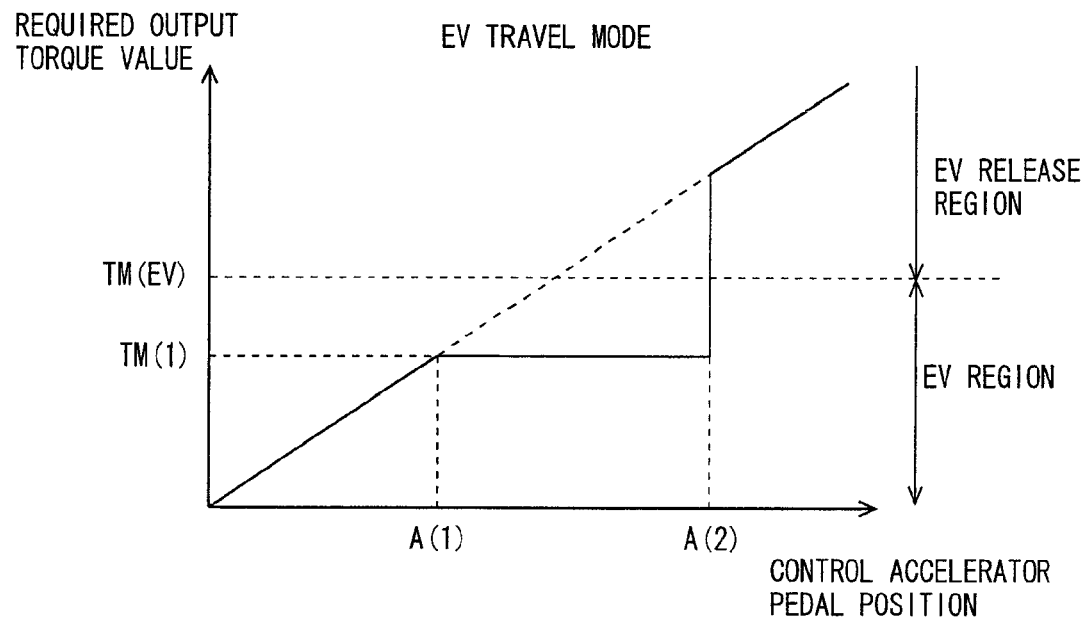

On the other hand, in the EV travel mode, as shown in FIG. 3, ECU 400 controls inverter 240 such that the required output torque value is limited to a predetermined value TM (1), which is not more than TM (EV), when the control accelerator pedal position has a value ranging from A (1) to A (2). Then the time point when the required output torque value exceeds TM (EV) and reaches an EV cancellation region is delayed as much as possible, and the EV travel time is assured for a long time.

When ECU 400 receives the signal requesting the cruise travel from cruise switch 408, ECU 400 performs the cruise travel control. During execution of the cruise travel control, ECU 400 controls engine ECU 280 and inverter 240 such that the vehicle speed is maintained at the target vehicle speed when there is no preceding vehicle, while the distance between two vehicles is maintained at the target distance, with an upper limit being the target vehicle speed, when there is a preceding vehicle.

Figure 4:
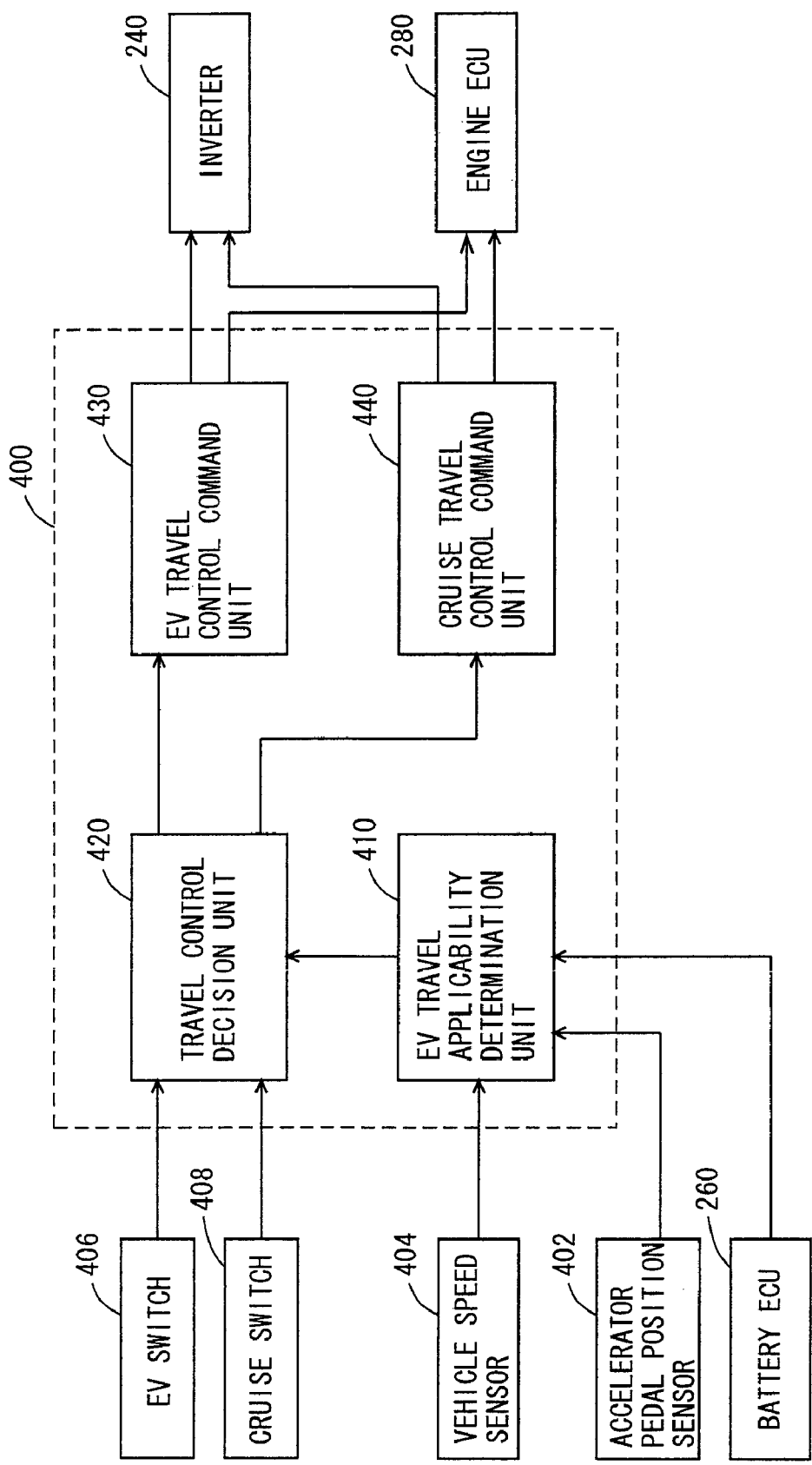
FIG. 4 is a functional block diagram of the control device according to the first embodiment of the present invention.

With reference to FIG. 4, a functional block diagram of the control device according to the present embodiment is described. As shown in FIG. 4, this control device includes an EV travel applicability determination unit 410, a travel control decision unit 420, an EV travel control command unit 430, and a cruise travel control command unit 440.

EV travel applicability determination unit 410 determines whether or not the state of the vehicle allows the EV travel, based on the signals from battery ECU 260, accelerator pedal position sensor 402, and vehicle speed sensor 404.

Travel control decision unit 420 decides which to perform, the EV travel control or the cruise travel control, based on the signal from EV switch 406, the signal from cruise switch 408, and the determination result from EV travel applicability determination unit 410.

EV travel control command unit 430 transmits a control signal to inverter 240 and engine ECU 280, based on the command from travel control determination unit 420, in order to control engine 120 and motor generator 140 such that the EV travel control is performed.

Cruise travel control command unit 440 transmits a control signal to inverter 240 and engine ECU 280, based on the command from travel control determination unit 420, in order to control engine 120 and motor generator 140 such that the cruise travel control is performed.

The control device having such functional blocks according to the present embodiment can be implemented either as hardware mainly configured by a digital circuit or an analog circuit, or as software mainly configured by a CPU (Central Processing Unit) and a memory included in the ECU and a program read from the memory and executed by the CPU. It is said, generally, that implementing as hardware is advantageous with respect to the operation speed, while implementing as software is advantageous with respect to the design change. A case where the control device is implemented as software is described below.

Figure 5:
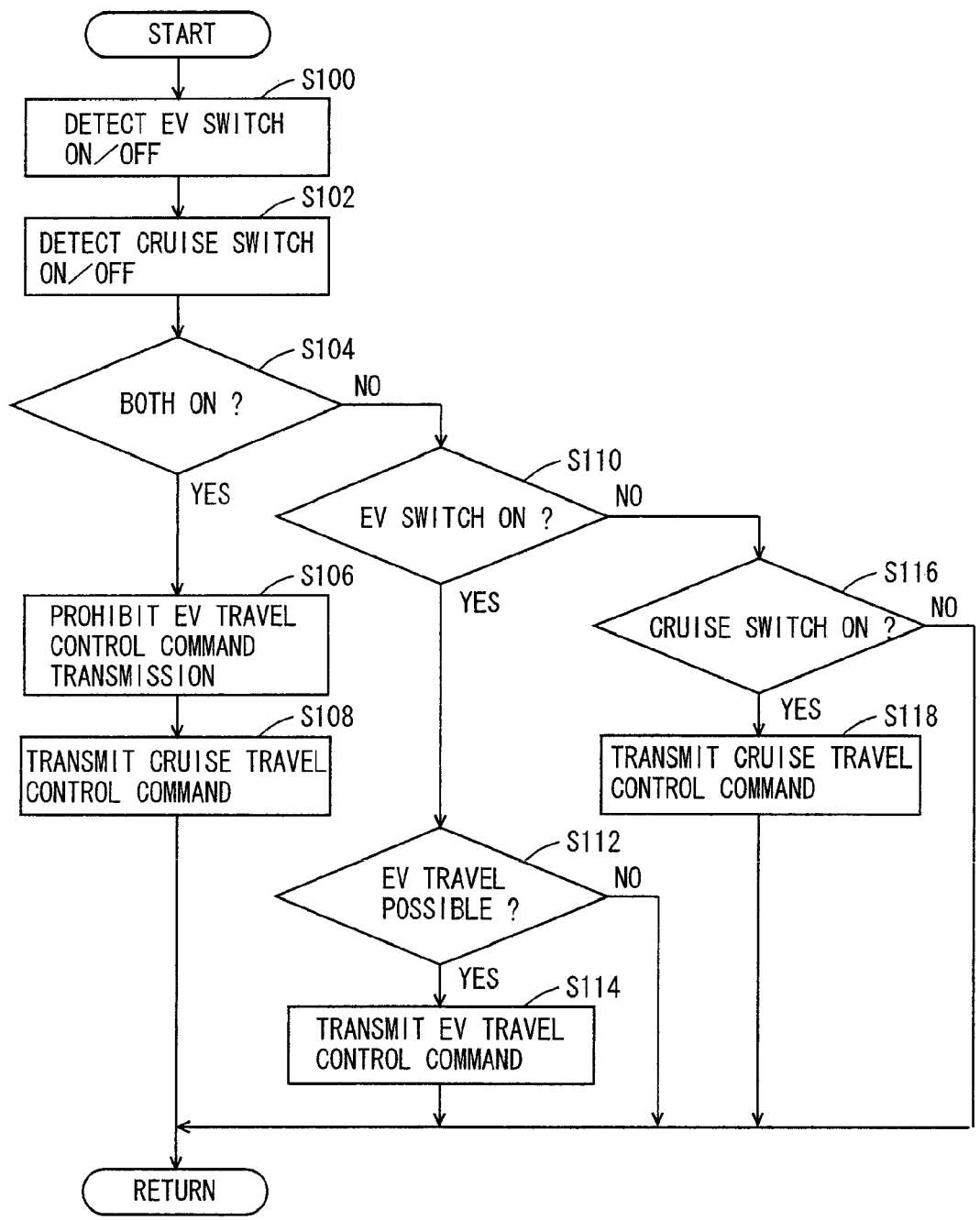
FIG. 5 is a flowchart showing a control structure of an ECU which is the control device according to the first embodiment of the present invention.

With reference to FIG. 5, a control structure of a program executed by ECU 400 serving as the control device according to the present embodiment is described. Note that this program is repeatedly executed in a predetermined cycle time.

At step (hereafter abbreviated as S) 100, ECU 400 detects on/off of EV switch 406 based on the signal from EV switch 406.

At S102, ECU 400 detects on/off of cruise switch 408 based on the signal from cruise switch 408.

At S104, ECU 400 determines whether or not both EV switch 406 and cruise switch 408 are on. When both are on (YES at S104), the processing moves on to S106. Otherwise (NO at S104), the processing moves on to S110.

At S106, ECU 400 prohibits transmission of the EV travel control command to inverter 240 and engine ECU 280.

At S108, ECU 400 transmits the cruise travel control command to inverter 240 and engine ECU 280.

At S110, ECU 400 determines whether or not EV switch 406 is on. When EV switch 406 is on (YES at S110), the processing moves on to S112. Otherwise (NO at S110), the processing moves on to S116.

At S112, ECU 400 determines whether or not the state of the vehicle allows the EV travel, based on the signals from battery ECU 260, accelerator pedal position sensor 402, and vehicle speed sensor 404. ECU 400 determines that the state of the vehicle allows the EV travel when, for example, SOC of battery 220 for traveling is not less than a predetermined value, the vehicle speed is not more than a predetermined vehicle speed, and the required output torque value is not more than the above-described TM (EV). Note that these thresholds are predetermined based on the output properties of battery 220 for traveling and motor generator 140, and the like, such that the motor travel can be performed in a stable manner. Note that the method for determining whether or not the vehicle allows the EV travel is not limited to this method. The processing moves on to S114 (YES at S112) when the state allows the EV travel. Otherwise (NO at S112), the processing ends.

At S114, ECU 400 transmits the EV travel control command to inverter 240 and engine ECU 280.

At S116, ECU 400 determines whether or not cruise switch 408 is on. When cruise switch 408 is on (YES at S116), the processing moves on to S118. Otherwise (NO at S116), the processing ends.

At S118, ECU 400 transmits the cruise travel control command to inverter 240 and engine ECU 280.

An operation of a hybrid vehicle controlled by the control device according to the present embodiment, based on the above structure and flow chart, is described below.

When the driver turns on EV switch 406 while cruise switch 408 is turned off (NO at S104, YES at S110), the EV travel control is performed as requested by the driver (S114), provided that the state of the vehicle allows the EV travel (YES at S112). Then engine 120 is turned off, allowing improvement in fuel efficiency and a quiet travel.

In such a condition, when the driver turns on cruise switch 408, it is considered that the driver desires to carry out the cruise travel during the EV travel.

During the EV travel, as shown in FIG. 3 described above, when the control accelerator pedal position has a value ranging from A (1) to A (2), the required output torque value is limited to a predetermined value TM (1), which is not more than TM (EV). Therefore, it is easier to maintain the state allowing the EV travel, while it is difficult to perform the cruise travel because the required output torque value is limited.

On the other hand, if the control accelerator pedal position increases and exceeds A (2), in order to bring the actual vehicle speed closer to the target vehicle speed in the cruise travel control, the restriction of the required output torque value is released and the required output torque exceeds TM (EV), therefore the EV travel is no longer performed (S112). That is, it is difficult to perform both the EV travel and the cruise travel at the same time. It is desirable to give priority to either the EV travel control or the cruise travel control.

Now assuming that priority is given to the EV travel control, though the required output torque value is limited to the predetermined value TM (1), which is not more than TM (EV), the vehicle could no longer be in the state allowing the EV travel, if the required output torque value exceeds TM (EV), SOC of battery 220 for traveling decreases below the predetermined value, or the vehicle speed becomes larger than the predetermined vehicle speed, thereafter, and could result in stopping the EV travel. Therefore, neither the EV travel nor the cruise travel is performed.

Figure 6:
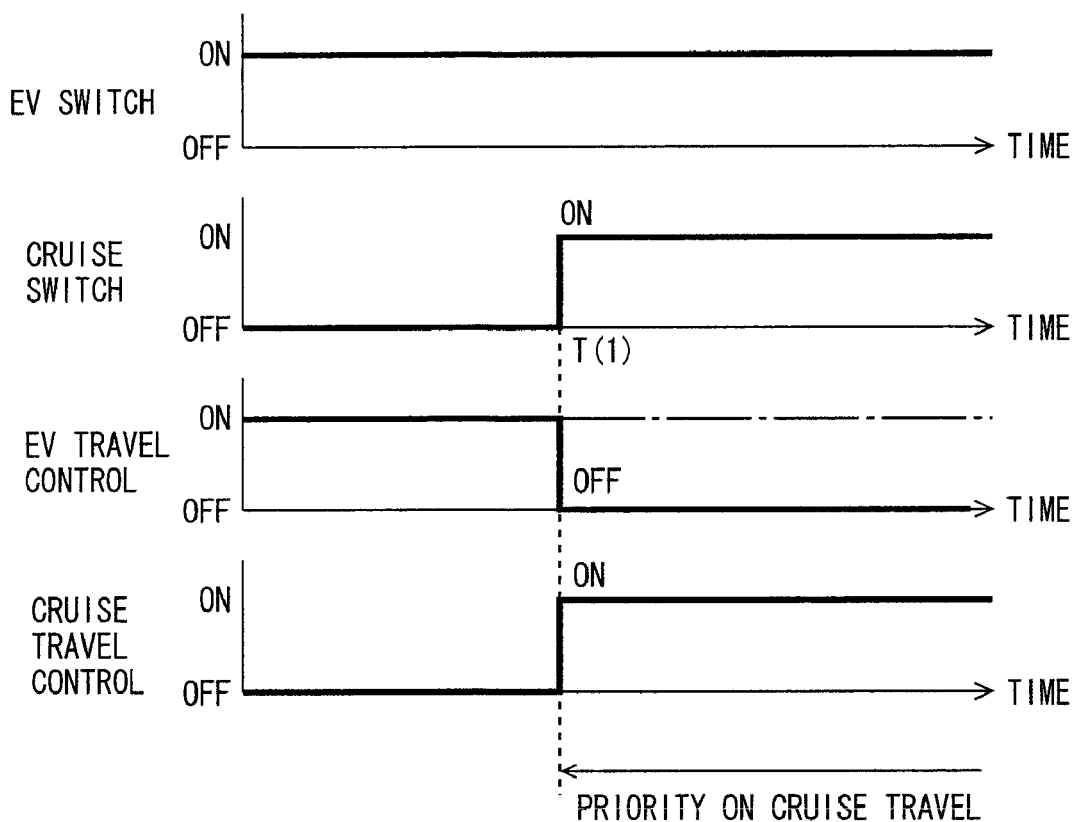
FIG. 6 is a timing chart showing an operation of the vehicle controlled by the control device according to the first embodiment of the present invention.

Then as shown in FIG. 6, when EV switch 406 is on and the EV travel control is performed, if cruise switch 408 is turned on at a time T (1), it is determined that both EV switch 406 and cruise switch 408 are on (YES at S104), and transmission of the EV travel control command will be then prohibited (S106) as well as the cruise travel control command is transmitted (S108). That is, priority is given to the cruise travel. By this, at least the cruise travel can be performed without fail. That is, a situation where neither the cruise travel nor the motor travel is performed, which is significantly different from the driver's intention, can be prevented.

As described above, according to the control device of the present embodiment, when both the EV switch and the cruise switch are on, the cruise travel is performed with priority over the EV travel, thereby, the cruise travel control can be performed more unfailingly.

Note that, in the present embodiment, the case where cruise switch 408 is on (YES at S116) and the cruise travel is performed (S118) has been described, however, the condition to perform the cruise travel is not limited to this case. For example, in a case where cruise switch 408 is on (YES at S116) and the condition for the cruise travel, having fewer restrictions on the output of the vehicle than the motor travel condition, is satisfied, the cruise travel may be performed. This causes a case where the cruise travel control is not performed even if cruise switch 408 is on. The frequency, however, with which the cruise travel is performed when priority is given to the cruise travel is at least higher than the frequency with which the motor travel is performed when priority is given to the motor travel. By this, the frequency with which neither the motor travel nor the cruise travel is performed even though both of them are selected can be reduced.

Moreover, though the present embodiment describes the case where the EV travel is always canceled and the cruise travel is performed when both EV switch 406 and cruise switch 408 are on, if the state of the vehicle allows both the EV travel and the cruise travel at the same time, the vehicle may be controlled to perform both travels at the same time and then, if the state of the vehicle no longer allows to perform both of them, priority may be given to the cruise travel.

Note that when controlling the vehicle such that both the EV travel and the cruise travel are performed at the same time, not the required output torque value at the time of the EV travel mode (see FIG. 3) but the required output torque value at the time of the engine travel mode (see FIG. 2) may be output, in order not to limit the required output torque value and to conduct the cruise travel easily.

Second Embodiment

The control device according to the present embodiment is described hereinafter. The control device according to the present embodiment is different only in the control structure of the program executed by ECU 400, as compared with the configuration of the control device according to the above-described first embodiment. The configuration other than that is the same as the configuration of the control device according to the above-described first embodiment. The same configurations have the same reference characters allotted. Their functions are also the same. Therefore, details of description thereof will not be repeated.

With reference to FIG. 7, the control structure of the program executed by ECU 400 which is a control device according to the present embodiment is described. Note that the same step in the flowchart shown in FIG. 7 as in the flowchart shown in the above-described FIG. 5 has the same step number allotted. The corresponding steps are also the same. Therefore, the detailed description thereof will not be repeated.

At S200, ECU 400 determines whether or not both EV switch 406 and cruise switch 408 are on. When both are on (YES at S200), the processing moves on to S202. Otherwise (NO at S200), the processing moves on to S110.

At S202, ECU 400 determines whether or not the state of the vehicle allows the EV travel, based on the signal from battery ECU 260, vehicle speed sensor 404, and accelerator pedal position sensor 402. Processing is moved on to S204 when the state allows the EV travel (YES at S202). Otherwise (NO at S202), the processing is moved on to S106.

At S204, ECU 400 prohibits transmission of the cruise travel control command to inverter 240 and engine ECU 280.

At S206, ECU 400 transmits the EV travel control command to inverter 240 and engine ECU 280.

An operation of a hybrid vehicle controlled by the control device according to the present embodiment, based on the above structure and flow chart, is described below.

As shown in FIG. 8, when EV switch 406 is on and the EV travel control is performed, if cruise switch 408 is turned on at a time T (2), it is determined that both EV switch 406 and cruise switch 408 are on (YES at S104). At time T (2), because the state of the vehicle allows the EV travel (YES at S202), transmission of the cruise travel control command is prohibited (S204) as well as the EV travel control command is transmitted (S206). That is, the EV travel continues to be performed. By this, the motor travel time can be made as long as possible, allowing improvement in fuel efficiency and a quiet travel for a longer time, compared to the case where priority is given to the cruise travel at time T (2).

At time T (3), when the state of the vehicle no longer allows the EV travel (NO at S202), priority is given to the cruise travel (S106, S108), like in the first embodiment. This allows at least the cruise travel after time T (3) when the motor travel is not possible.

As described above, according to the control device of the present embodiment, when both the motor travel and the cruise travel are selected by the driver, priority is given to the cruise travel in the case where the state of the vehicle does not allow the motor travel. Therefore, when the motor travel is not allowed, the cruise travel control can be performed more unfailingly, like in the first embodiment. Furthermore, compared to the case where priority is simply given to the cruise travel, the motor travel time can be made longer, allowing improvement in fuel efficiency and a quiet travel for a longer time.

The embodiments disclosed herein must be considered illustrative in all points and not restrictive. The scope of the present invention is shown not by the aforementioned description but by the scope of claims, and it is intended that all modifications within the meaning and range equivalent to the scope of claims are included.

The invention claimed is:

1. A control device for a vehicle with an internal combustion engine and a rotating electric machine mounted, traveling by motive power of at least either one of said internal combustion engine and said rotating electric machine, said control device comprising:
    a motor travel selection detecting unit that detects that a driver has selected a motor travel allowing said vehicle to travel by motive power of said rotating electric machine with said internal combustion engine being off;
    a cruise travel selection detecting unit that detects that the driver has selected a cruise travel in which at least either one of the speed of said vehicle and the distance from another vehicle is automatically maintained at a predetermined value; and
    a control unit connected to the motor travel selection detecting unit and the cruise travel selection detecting unit, wherein
    said control unit determines whether or not a predetermined motor travel condition is satisfied, based on a state of said vehicle, controls said vehicle to perform said motor travel when it is detected that the driver has selected said motor travel and when it is determined that said motor travel condition is satisfied, controls said vehicle to perform said cruise travel when it is detected that the driver has selected said cruise travel, and controls said vehicle to perform said cruise travel, with priority over said motor travel, when it is detected that the driver has selected both said motor travel and said cruise travel.

2. The control device according to claim 1, wherein said control unit performs said cruise travel with priority, when it is determined that said motor travel condition is not satisfied, in addition to that it is detected that the driver has selected both said motor travel and said cruise travel.

3. The control device according to claim 1, wherein said motor travel condition includes a condition that a required output value of said rotating electric machine is not more than a predetermined threshold.

4. The control device according to claim 3, wherein said control unit controls said rotating electric machine such that said required output value is not more than said threshold, when said motor travel is performed.

5. The control device according to claim 1, wherein said control unit performs said cruise travel when a cruise travel condition, having fewer restrictions on an output of said vehicle than said motor travel condition, is satisfied, in addition to that it is detected that the driver has selected said cruise travel.

6. A control device for a vehicle with an internal combustion engine and a rotating electric machine mounted, traveling by motive power of at least either one of said internal combustion engine and said rotating electric machine, said control device comprising:
    a device that detects that a driver has selected a motor travel allowing said vehicle to travel by motive power of said rotating electric machine with said internal combustion engine being off;
    a device that determines whether or not a predetermined motor travel condition is satisfied, based on a state of said vehicle;
    a motor travel device that controls said vehicle to perform said motor travel when it is detected that the driver has selected said motor travel and when it is determined that said motor travel condition is satisfied;
    a device that detects that the driver has selected a cruise travel in which at least either one of the speed of said vehicle and the distance from another vehicle is automatically maintained at a predetermined value;
    a cruise travel device that controls said vehicle to perform said cruise travel when it is detected that the driver has selected said cruise travel; and
    a control device that controls said motor travel device and said cruise travel device to perform said cruise travel, with priority over said motor travel, when it is detected that the driver has selected both said motor travel and said cruise travel.

7. The control device according to claim 6, wherein said control device includes a device for performing said cruise travel with priority, when it is determined that said motor travel condition is not satisfied, in addition to that it is detected that the driver has selected both said motor travel and said cruise travel.

8. The control device according to claim 6, wherein said motor travel condition includes a condition that a required output value of said rotating electric machine is not more than a predetermined threshold.

9. The control device according to claim 8, wherein said control device further comprises a device that controls said rotating electric machine such that said required output value is not more than said threshold, when said motor travel is performed.

10. The control device according to claim 6, wherein said cruise travel device includes a device that performs said cruise travel when a cruise travel condition, having fewer restrictions on an output of said vehicle than said motor travel condition, is satisfied, in addition to that it is detected that the driver has selected said cruise travel.

11. A control method that a control device conducts, the control device controlling a vehicle with an internal combustion engine and a rotating electric machine mounted and traveling by motive power of at least either one of said internal combustion engine and said rotating electric machine, said method comprising:
    detecting that a driver has selected a motor travel allowing said vehicle to travel by motive power of said rotating electric machine with said internal combustion engine being off;
    determining whether or not a predetermined motor travel condition is satisfied, based on a state of said vehicle;
    controlling said vehicle to perform said motor travel when it is detected that the driver has selected said motor travel and when it is determined that said motor travel condition is satisfied;
    detecting that the driver has selected a cruise travel in which at least either one of the speed of said vehicle and the distance from another vehicle is automatically maintained at a predetermined value;
    controlling said vehicle to perform said cruise travel, when it is detected that the driver has selected said cruise travel; and controlling said vehicle to perform said cruise travel, with priority over said motor travel, when it is detected that the driver has selected both said motor travel and said cruise travel.

12. The control method according to claim 11, wherein the method further includes:
performing said cruise travel with priority, when it is determined that said motor travel condition is not satisfied, in addition to that it is detected that the driver has selected both said motor travel and said cruise travel.

13. The control method according to claim 11, wherein said motor travel condition includes at least a condition that a required output value of said rotating electric machine is not more than a predetermined threshold.

14. The control method according to claim 13, wherein said control method further comprises controlling said rotating electric machine such that said required output value is not more than said threshold, when said motor travel is performed.

15. The control method according to claim 11, wherein the method further includes:
performing said cruise travel when a cruise travel condition, having fewer restrictions on an output of said vehicle than said motor travel condition, is satisfied, in addition to that it is detected that the driver has selected said cruise travel.

\* \* \* \* \*